United States Patent
Rundle

[11] Patent Number: 6,116,189
[45] Date of Patent: Sep. 12, 2000

[54] BIRD FEEDER

[75] Inventor: Gregory E. Rundle, Richmond, Canada

[73] Assignee: Listo Products, Ltd., Surrey, Canada

[21] Appl. No.: 09/215,114

[22] Filed: Dec. 17, 1998

[51] Int. Cl.[7] .......................... A01K 39/04; A01K 39/01
[52] U.S. Cl. .......................................... 119/51.5; 119/52.2
[58] Field of Search .................................. 119/52.1, 52.2, 119/52.3, 51.5

[56] References Cited

U.S. PATENT DOCUMENTS

| | | |
|---|---|---|
| 2,532,726 | 12/1950 | Lajoie et al. . |
| 2,937,617 | 5/1960 | Brody et al. ............................ 119/51.5 |
| 3,645,235 | 2/1972 | Suchla . |
| 3,730,139 | 5/1973 | Moore . |
| 3,818,868 | 6/1974 | Boehland, Jr. . |
| 4,033,296 | 7/1977 | Cudmore . |
| 4,104,986 | 8/1978 | Dunigan . |
| 4,104,987 | 8/1978 | Winston . |
| 4,140,081 | 2/1979 | Killmon . |
| 4,150,505 | 4/1979 | Voelker ........................................ 43/69 |
| 4,167,917 | 9/1979 | Noll . |
| 4,173,200 | 11/1979 | Olsen et al. . |
| 4,242,983 | 1/1981 | Moore . |
| 4,242,984 | 1/1981 | Smith . |
| 4,242,985 | 1/1981 | Freeborn .................................... 119/54 |
| 4,442,793 | 4/1984 | Overpeck et al. . |
| 4,471,721 | 9/1984 | Vail ......................................... 43/61 X |
| 4,506,629 | 3/1985 | Cross . |
| 4,515,108 | 5/1985 | Rankin, Jr. . |
| 4,561,383 | 12/1985 | Tidwell . |
| 4,632,061 | 12/1986 | Tucker et al. . |
| 4,646,686 | 3/1987 | Furlani ..................................... 119/63 X |
| 4,702,198 | 10/1987 | Holyoak . |
| 4,747,370 | 5/1988 | Olson ....................................... 119/52.2 |
| 4,768,466 | 9/1988 | Burns et al. . |
| 4,846,110 | 7/1989 | Reynolds . |
| 4,889,075 | 12/1989 | Byrns . |
| 4,928,631 | 5/1990 | Smith . |
| 5,095,847 | 3/1992 | Coffer ..................................... 119/52.2 |
| 5,235,935 | 8/1993 | Edwards ............................... 119/52.3 X |
| 5,655,477 | 8/1997 | Hoffman et al. ........................ 119/52.2 |

*Primary Examiner*—Robert P. Swiatek
*Attorney, Agent, or Firm*—Fulwider Patton Lee & Utecht, LLP

[57] ABSTRACT

A bird feeder comprising an outer enclosure having one or more access ports to the interior of the enclosure and an insert mounted for telescoping movement into the interior of the outer enclosure. The insert is formed with at least one compartment for storing feed with one or more openings into the insert adapted to permit access to the compartment. The insert is dimensioned to define a collection space between the outer enclosure and the insert when the insert is telescoped into the interior of the outer member. The collection space accumulates feed spilled from the compartment by feeding birds to prevent wastage. The insert is movable between a first raised position in which the openings in the insert generally align with the access ports of the outer enclosure to permit feeding by birds, and a second lowered position in which the compartment of the insert is positioned to automatically receive spilled feed from the collection space.

18 Claims, 5 Drawing Sheets

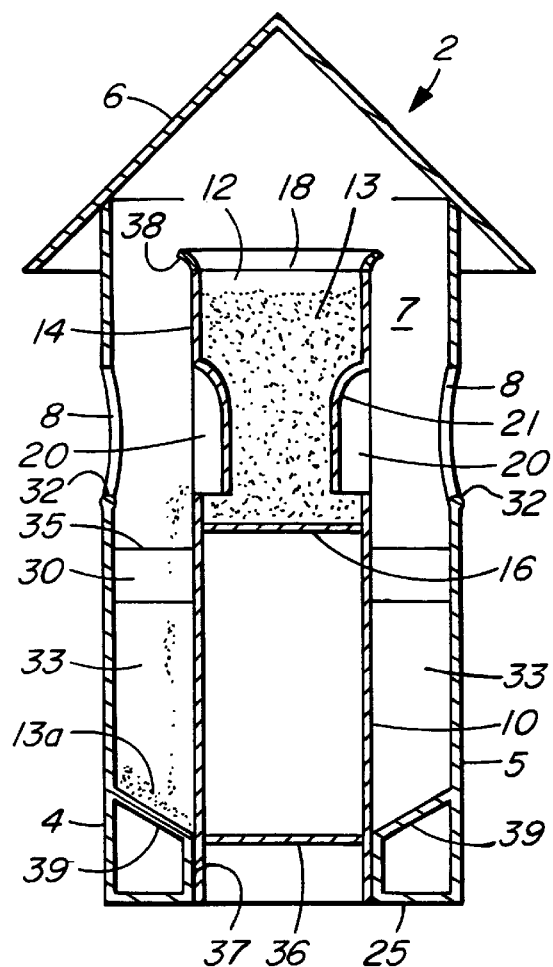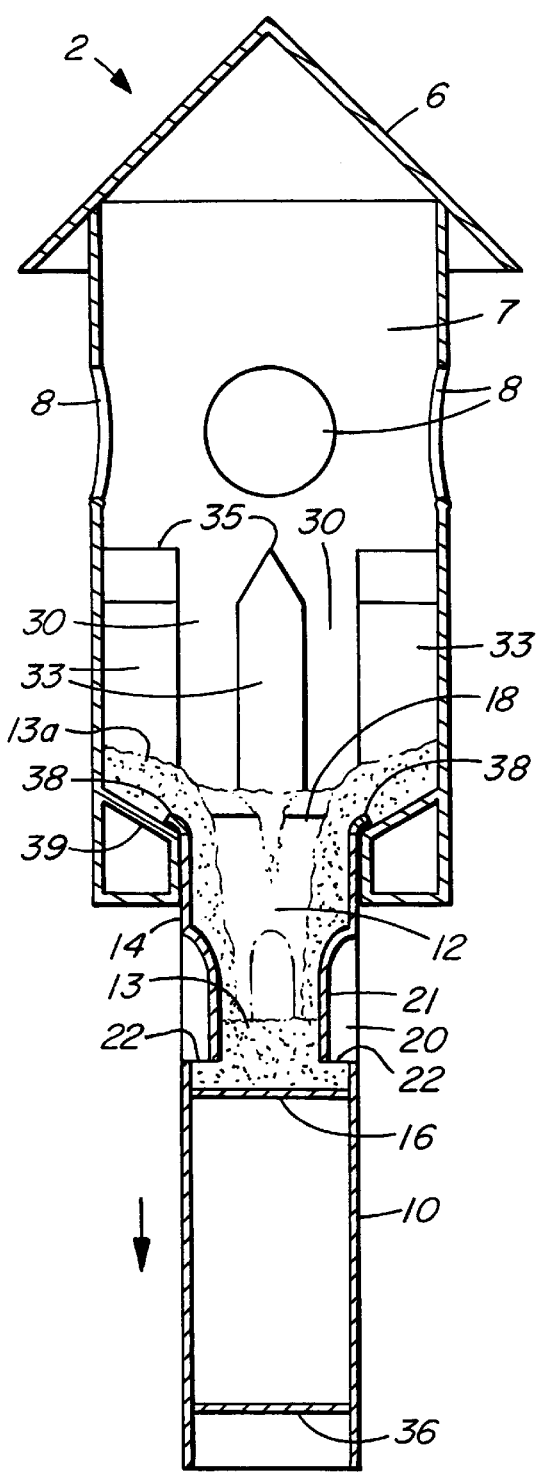
FIG. 1
FIG. 2

BIRD FEEDER

FIELD OF THE INVENTION

This invention relates to a bird feeder.

BACKGROUND OF THE INVENTION

Bird houses and feeders for supplying food and shelter to birds are extremely popular. Numerous bird feeder designs have been developed and are disclosed in the following U.S. Patents:

U.S. Pat. No. 3,730,139 to Moore
U.S. Pat. No. 4,646,686 to Furlani
U.S. Pat. No. 3,645,235 to Suchla
U.S. Pat. No. 5,655,477 to Hoffman et al.
U.S. Pat. No. 2,532,726 to LaJoie et al.

A major drawback with existing bird feeder designs is that there is a tendency for a large proportion of the feed, usually in the form of seeds, to be spilled from feeder to fall to the ground due to the natural vigorous eating habits of birds or due to windy conditions. Feeder designs that employ a tray to catch spilled seeds often expose the feed collected in the tray to rain. Feed on the ground or exposed in the tray tends to decompose and jeopardizes the health of birds eating it. Spilled feed tends to attract pests, such as rodents, and presents an unsightly mess.

SUMMARY OF THE INVENTION

There is therefore a need for a bird feeder design that limits spilled feed and keeps the stored feed dry. When spilled feed is limited, it becomes possible to incorporate into the feeder other desirable features such as bird baths or planters without fear of contamination of these areas by spilled feed.

Accordingly, the present invention provides a bird feeder comprising:

an outer enclosure having one or more access ports to the interior of the enclosure;

an insert mounted for telescoping movement into the interior of the outer enclosure, the insert being formed with at least one compartment for storing feed with one or more openings into the insert adapted to permit access to the at least one compartment, and the insert being dimensioned to define a collection space between the outer enclosure and the insert for accumulating feed spilled from the at least one compartment when the insert is telescoped into the interior of the outer member;

whereby the insert is movable between a first position in which the openings in the insert generally align with the access ports of the outer enclosure, and a second position in which the at least one compartment of the insert is positioned to receive spilled feed from the collection space.

The bird feeder of the present invention collects spilled feed and provides a convenient system for reusing the spilled feed by efficiently loading it back into the feed storage compartment.

The bird feeder of the present invention is safe, easy to use, durable and easily maintained.

BRIEF DESCRIPTION OF THE DRAWINGS

Aspects of the present invention are illustrated, merely by way of example, in the accompanying drawings in which:

FIG. 1 is a section view of a preferred embodiment of the bird feeder according to the present invention in its normal operating configuration with the feeder full of feed;

FIG. 2 is a section view of the feeder of FIG. 1 with the insert lowered to the second position to re-fill the feed compartment;

DESCRIPTION OF THE PREFERRED EMBODIMENTS

Figure 3:
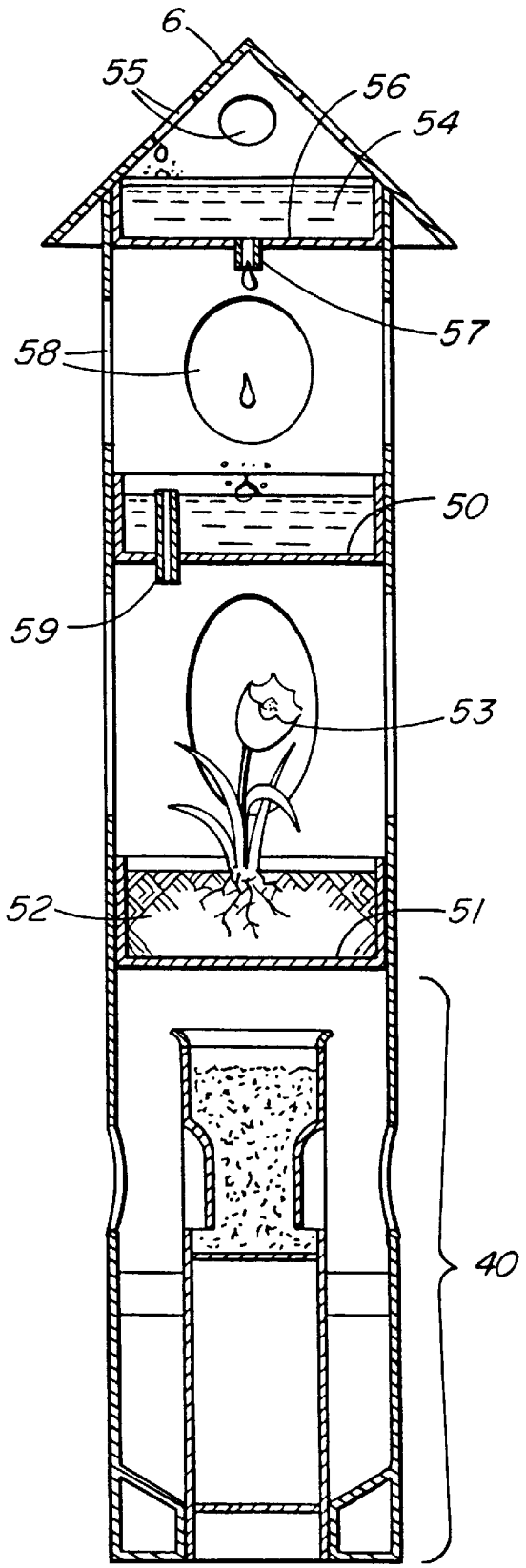
FIG. 3 is a section view of a second embodiment of the present invention incorporating other bird attracting features such as a water reservoir and a planter.

Referring to FIGS. 1 and 2, there is shown in cross-section a view through a bird feeder 2 according to a preferred embodiment of the present invention. The bird feeder comprises an outer enclosure 4 having side walls 5 capped with a roof 6 to seal the interior 7 of the enclosure from the elements. Roof 6 preferably includes a hook (not shown) or other member for holding or suspending the bird feeder. Side walls 5 are formed with access ports 8 that communicate interior 7 with the outside environment.

An insert 10 is mounted for telescopic movement into interior 7 of outer enclosure 4. Insert 10 is formed with a compartment 12 for storing particulate bird feed 13. Compartment 12 is defined by side walls 14, a floor 16 and an open top 18. Side walls 14 are formed with openings 20 to permit access to the feed in the compartment. Openings 20 are of a conventional configuration including a downwardly and inwardly extending, generally arcuate deflector wall 21 that terminates adjacent an open trough 22. Wall 21 holds back feed 13 in compartment 12 until feed is removed from trough 22 by feeding birds whereupon feed flows under gravity into the trough.

In the illustrated embodiment, outer enclosure 4 and insert 10 are generally cylindrical. Base 25 of outer enclosure 4 has an opening dimensioned to slidably receive insert 10. There are guides 33 to guide telescopic movement of insert 10 within the interior of outer enclosure 4. In the illustrated embodiment, guides 33 comprise a series of elongate generally rectangular bodies extending upwardly from base 25 and into the interior of outer enclosure 4. The bodies are spaced about the inner circumference of the outer enclosure. The inner surfaces 37 of the bodies slidably engage side walls 14 of insert 10 to constrain movement in a substantially vertical direction and to centre the insert within the enclosure. When insert 10 is fully inserted into outer enclosure 4 as illustrated in FIG. 1, an annular collection space 30 is created between the side walls 5 of outer enclosure 4 and the side walls 14 of insert 10 for accumulating feed spilled from compartment 12 due to the feeding activity of birds. Guide bodies 33 are formed with sloped tops that meet at an apex 35 to direct feed to either side of the bodies. As well, when insert 10 is fully inserted, openings 20 in insert 10 are generally aligned with access ports 8 of outer enclosure 4. Feeding birds perch on the lower edge 32 of access ports 8 and reach across collection space 30 to feed from troughs 22 at the lower edge of openings 20.

Gradually, collection space 30 will fill with spilled bird feed 13a as shown in FIG. 1. At this point, insert 10 is movable to a second lowered position shown in FIG. 2 in which compartment 12 of insert 10 is positioned to receive the spilled feed from the collection space. Preferably, a handle 36 is formed adjacent the lower edge of insert 10 extending between the walls of insert 10 to provide a convenient location for the user to pull insert 10 downwardly.

When insert 10 is moved to the second lowered position, the open top 18 of compartment 12 is aligned with base 25 of outer enclosure 4. Collection space 30 is eliminated as wall 14 is lowered and collected feed falls inwardly into compartment 12 by gravity. Preferably, base 25 of outer enclosure 10 is formed with a downwardly, inwardly slope upper surface 39 to encourage collected feed to fall into compartment 12. In addition, open top 18 of compartment 12 is preferably formed with a flexible lip 38 to engage base 25 of the outer enclose and prevent spillage of collected feed past base 25 when insert 10 is moved to the second lowered position. Lip 38 also acts to impede complete removal of insert 10 from outer enclosure 4. When a user wants to remove insert 10 completely from outer enclosure 4 for restocking with fresh feed or for cleaning, they must make a conscious effort to pull insert 10 with sufficient force to cause flexible lip 38 to move past base 25. Note that complete removal of insert 10 for restocking and cleaning allows outer enclosure 4 to remain in place when these operations are being carried out so that the entire bird feeder does not have to be taken down.

Guide bodies 33 are positioned to be vertically aligned below openings 20 in side walls 14 of insert 10 and dimensioned to seal the openings as the insert is moved from the first raised position of FIG. 1 to the second lowered position of FIG. 2. Guide bodies 33, therefore, act as baffles to prevent collected feed in collection space 30 from falling into openings 20 as the insert is moved to the second position.

The basic bird feeder of FIGS. 1 and 2 can be enhanced by adding additional bird attracting features such as a bird bath/drinking station and a planter. Such an arrangement is shown in FIG. 3. The basic bird feeder of the present invention with removable insert 10 is located at the bottom of outer enclosure 4 designated by reference number 40, and operates in an identical manner to the feeder of FIGS. 1 and 2. However, the bird feeder of FIG. 3 includes an elongated outer enclosure that houses a water collection compartment or reservoir 54, a bird bath/drinking station 50 and a planter compartment 51 containing soil 52 and living plants 53 above feeding station 40.

Water reservoir 54 is located directly beneath roof 6. Preferably, an aperture 55 is formed in roof 6 to permit precipitation to automatically fill the reservoir. Aperture 55 also provides a convenient location to insert a hose. The floor 56 of reservoir 54 is formed with a valve 57 to control the flow of water from the reservoir to bird bath/drinking compartment 50 below. Openings 58 in the outer enclosure side walls provide access to compartment 50. The level of water in the bath/drinking compartment is controlled by an overflow passage 59 and set to a level appropriate for birds to drink and bathe. If the water delivered by valve 57 rises above a predetermined level established by the height of overflow passage 59, the water drains over and down passage 59 to be collected in planter compartment 51.

Figure 4:
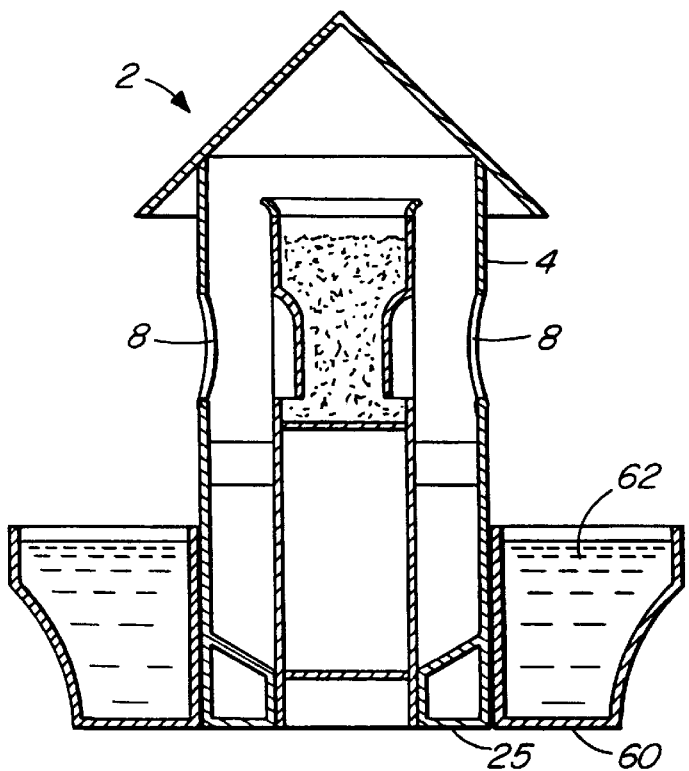
FIG. 4 is a section view of the feeder of FIG. 1 incorporating a detachable water reservoir.
Figure 5:
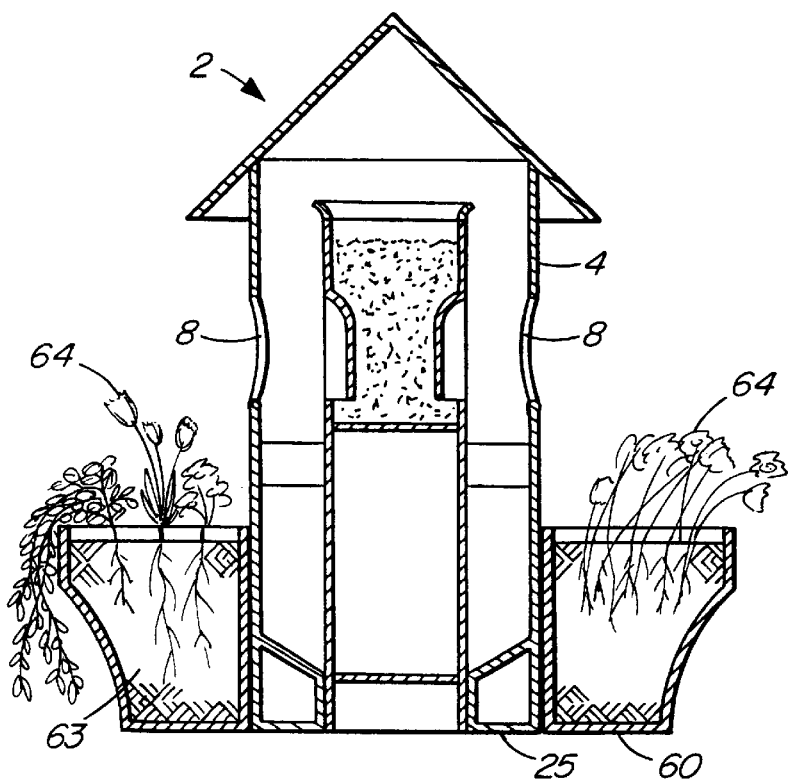
FIG. 5 is a section view of the feeder of FIG. 1 incorporating a detachable planter compartment.

FIG. 4 and 5 show further variations of a bird feeder according to the present invention that includes a removable tray 60 positioned adjacent the base 25 of outer enclosure 4. Tray 60 is an annular compartment dimensioned to fit about outer enclosure 4 below access ports 8. Tray 60 can be filled with water 62 to act as a bird bath/drinking station or filled with soil 63 and plants 64 to act as a planter. Tray 60 can also be formed with spaced, radially extending internal partition walls to divide tray 60 into different segments with each segment being assigned a particular use by the user.

Figure 6:
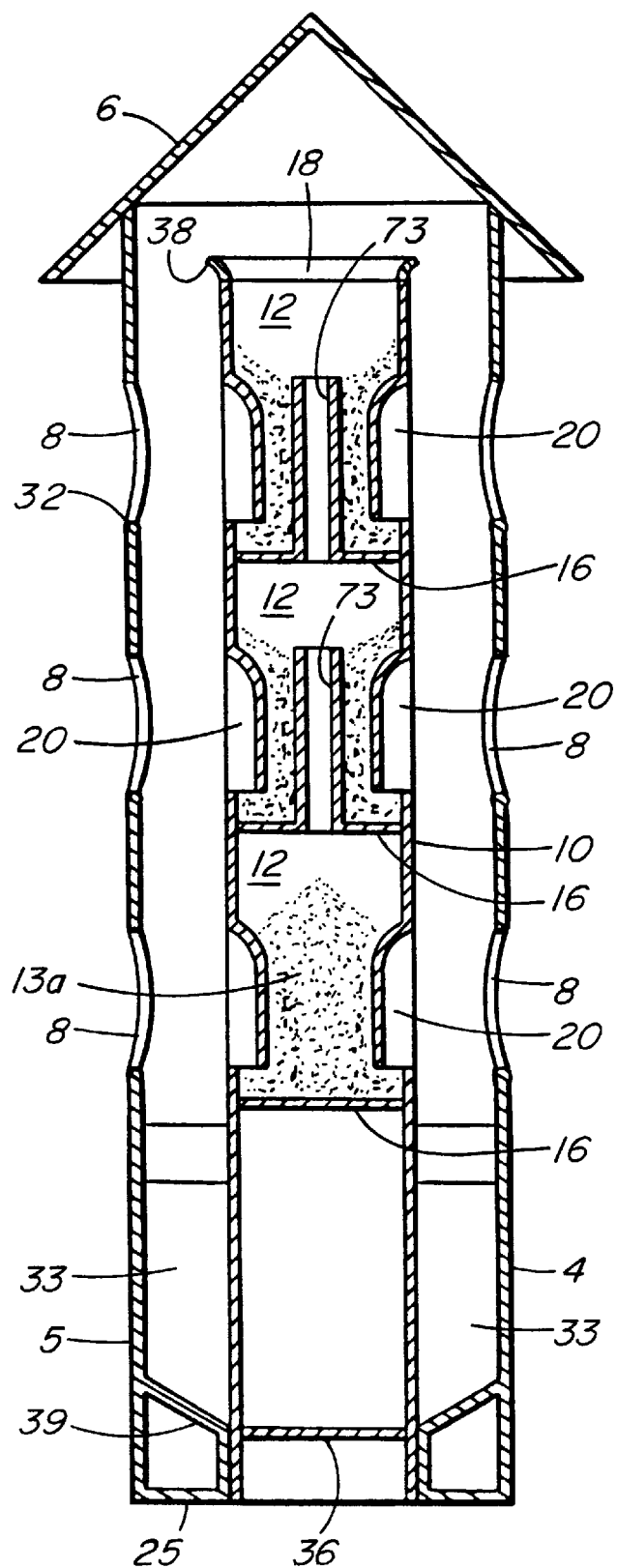
FIG. 6 is a section view of a third embodiment of the bird feeder of the present invention with multiple stacked feed compartments.

FIG. 6 shows a still further embodiment of the present invention designed to provide more feeding stations for birds. In this embodiment, insert 10 is elongated and formed with a series of spaced floors 16 to divide the insert into a plurality of stacked compartments 12. Each of the stacked compartments 12 has its own openings 20 to permit access to the feed in the compartment. Outer enclosure 4 is also elongated and includes access ports 8 positioned to align with openings 20 of insert 10 when the insert is fully inserted into the enclosure.

Adjacent stacked compartments 12 communicate with each other by a passage 73 extending upwardly from the floor of the upper compartment. Feed from open top 18 falls through passages 73 to fill the lowermost compartment and then consecutively higher compartments.

Figure 7:
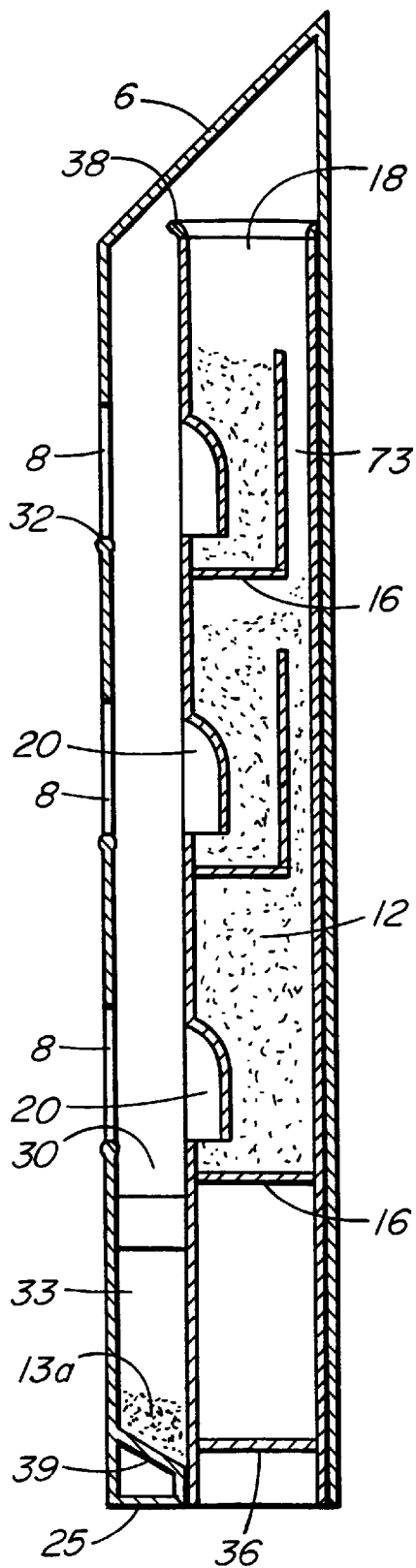
FIG. 7 is a section view of a fourth embodiment of the bird feeder of the present invention showing a side elevation of a feeder intended for attachment to a generally vertical surface.
Figure 8:
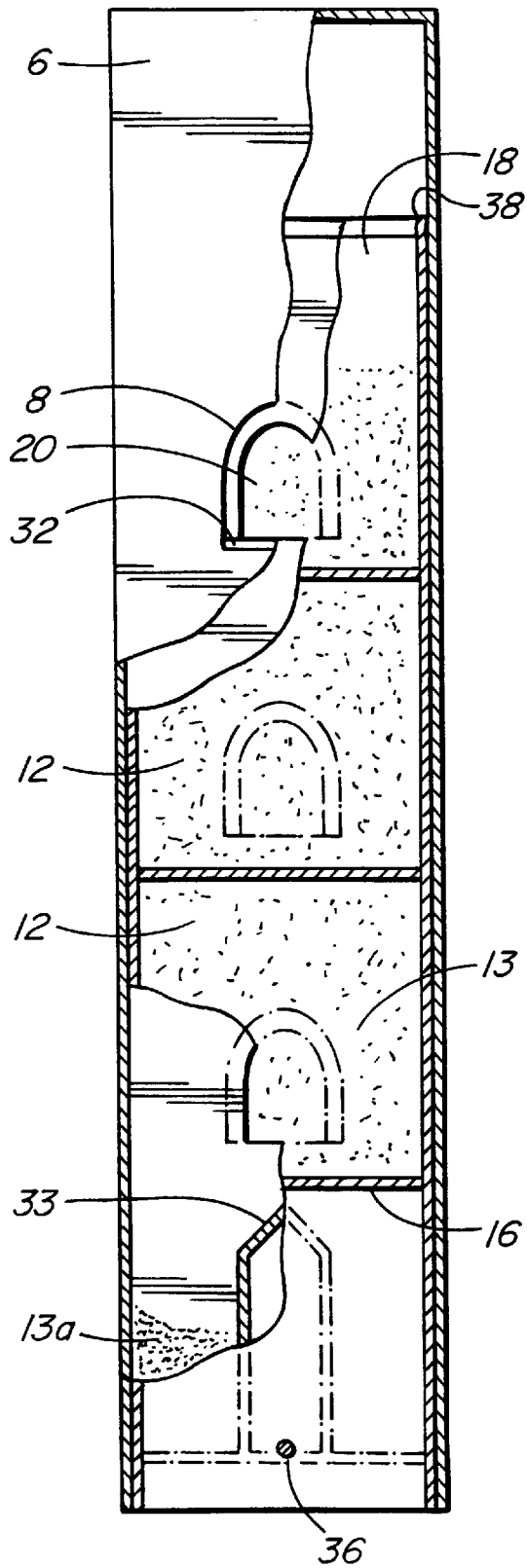
FIG. 8 is a section view showing a front elevation view of the feeder of FIG. 7.

The bird feeder of the present invention is not limited to the generally cylindrical shape disclosed to this point. FIGS. 7 and 8 are side elevation and front elevation views, respectively, of an alternative bird feeder design of generally rectangular cross-section. This design uses multiple stacked feed compartments 12 and is suitable for connection directly to a generally vertical mounting wall. Features equivalent to the generally cylindrical embodiments of FIGS. 1–6 are labelled with the same reference numbers in FIGS. 7. The rectangular cross-section feeder operates in an identical manner to the previously described cylindrical embodiments. Insert 10 is movable between a first position in which access ports 8 and openings 20 are aligned to permit feeding from compartments 12 and a second position in which insert 10 is lowered so that spilled feed stored in collection space 30 is re-filled into open top 18 of the insert. FIG. 8 is effective at showing the vertical alignment of guide/baffle 33 with openings 20 in insert 10. As insert 10 is lowered to the second position, guide 33 effectively covers each opening 20 in sequence as the openings move past to prevent collected feed 30 from falling into the openings.

The various bird feeder designs of the present invention are preferably formed from plastic components. The plastic can be transparent to allow the user to quickly determine if compartments 12 of inner insert 10 require filling or if collection space 30 is filled with spilled feed.

Although the present invention has been described in some detail by way of example for purposes of clarity and understanding, it will be apparent that certain changes and modifications may be practised within the scope of the appended claims.

I claim:

1. A bird feeder comprising:
   an outer enclosure having one or more access ports to the interior of the enclosure;
   an insert mounted for telescoping movement into the interior of the outer enclosure, the insert being formed with at least one compartment for storing feed with one or more openings into the insert adapted to permit access to the at least one compartment, and the insert being dimensioned to define a collection space between the outer enclosure and the insert for accumulating feed spilled from the at least one compartment when the insert is telescoped into the interior of the outer member;

whereby the insert is movable between a first position in which the one or more openings in the insert generally align with the one or more access ports of the outer enclosure, and a second position in which the at least one compartment of the insert is positioned to receive spilled feed from the collection space.

2. A bird feeder as claimed in claim 1 in which the insert is formed with side walls and a floor to define the at least one compartment with an open top through which feed is introducible into the at least one compartment.

3. A bird feeder as claimed in claim 2 in which the outer enclosure is formed with side walls, an upper cover and a base with an appropriately dimensioned opening in the base to telescopically receive the insert for movement into the interior of the outer enclosure.

4. A bird feeder as claimed in claim 3 in which the open top of the at least one compartment is formed with a flexible lip to engage the base of the outer enclosure when the insert is moved to the second position.

5. A bird feeder as claimed in claim 3 in which the second position of the insert places the open top of the at least one compartment adjacent the base of the outer enclosure such that the collection space is eliminated and feed in the collection space can fall into the at least one compartment by gravity.

6. A bird feeder as claimed in claim 3 in which the base of the outer enclosure is sloped to encourage collected feed to move into the at least one compartment of the insert when the insert is in the second position.

7. A bird feeder as claimed in claim 2 in which the insert includes a series of spaced floors to divide the insert into a plurality of compartments stacked one atop the other.

8. A bird feeder as claimed in claim 7 in which adjacent upper and lower compartments communicate with each other by a passage extending upwardly from the floor of the upper compartment.

9. A bird feeder as claimed in claim 2 including guides to guide telescopic movement of the insert within the interior of the outer enclosure.

10. A bird feeder as claimed in claim 9 in which the guides comprises a plurality of surfaces mounted to the outer enclosure and extending into the interior thereof to slidably engage the side walls of the insert.

11. A bird feeder as claimed in claim 9 in which the guides are aligned below the one or more openings in the insert and dimensioned to seal the one or more openings as the insert is moved from the first position to the second position.

12. A bird feeder as claimed in claim 1 in which the outer enclosure includes a removable tray portion formed with compartments.

13. A bird feeder as claimed in claim 1 in which the outer enclosure and the insert are generally cylindrical.

14. A bird feeder as claimed in claim 1 including a water reservoir.

15. A bird feeder as claimed in claim 14 in which the water reservoir comprises a compartment mounted in the interior of the outer enclosure with adjacent openings in the enclosure to permit access to the compartment.

16. A bird feeder as claimed in claim 15 including a water collection compartment mounted in the outer enclosure above the water reservoir, the water collection compartment having an inlet to receive water and a valve to release water to the water reservoir below.

17. A bird feeder as claimed in claim 15 including an overflow tube in the compartment to permit drainage of water from the compartment if the water reaches a predetermined level.

18. A bird feeder as claimed in claim 17 including a planter compartment in the outer enclosure below the water reservoir to receive water from the overflow tube.

\* \* \* \* \*